(12) United States Patent
  Munson

(10) Patent No.: US 8,281,730 B2
(45) Date of Patent: Oct. 9, 2012

(54) WATERCRAFT WITH ASYMMETRICAL AND SYMMETRICAL BOAT HULL

(76) Inventor: William Munson, Edmonds, WA (US)

( * ) Notice: Subject to any disclaimer, the term of this patent is extended or adjusted under 35 U.S.C. 154(b) by 8 days.

(21) Appl. No.: 12/699,923

(22) Filed: Feb. 4, 2010

(65) Prior Publication Data

US 2011/0185959 A1    Aug. 4, 2011

(51) Int. Cl.
  *B63B 1/32*         (2006.01)
(52) U.S. Cl. ........................................... 114/288
(58) Field of Classification Search .................. 114/273, 114/274, 288, 289, 290, 292
  See application file for complete search history.

(56) References Cited

U.S. PATENT DOCUMENTS

| | | | | |
|---|---|---|---|---|
| 3,918,382 A | * | 11/1975 | Austin ........................... | 114/273 |
| 4,951,591 A | * | 8/1990 | Coles ............................ | 114/274 |
| 5,351,641 A | * | 10/1994 | Robson ......................... | 114/288 |
| 5,458,078 A | * | 10/1995 | Perette .......................... | 114/288 |
| 5,570,649 A | * | 11/1996 | Austin ........................... | 114/292 |
| 7,318,388 B2 | * | 1/2008 | Scism et al. ................... | 114/273 |

* cited by examiner

*Primary Examiner* — Lars A Olson
(74) *Attorney, Agent, or Firm* — Dean A. Craine

(57) ABSTRACT

A watercraft that uses a hybrid hull that has two asymmetrical front hull sections that gradually transition rearward and form two symmetrical rear hull sections separated by a tunnel. The two front hull sections are longitudinally aligned on opposite sides of the hull's center axis and form a front pickle. Each front hull section includes a flat, vertically aligned inboard surface that intersects with a conical shaped span deck that extends along the bottom of the hull and terminates at a transversely aligned front landing door or front transom. The lower edge of each front hull section gradually curves rearward and downward forming a shape keel. The two rear hull sections are v-shaped longitudinally aligned with the two front hull sections with a narrow tunnel formed between them that communicates with the span deck. Formed on each rear hull section is a delta surface with a skeg attached thereto.

4 Claims, 9 Drawing Sheets

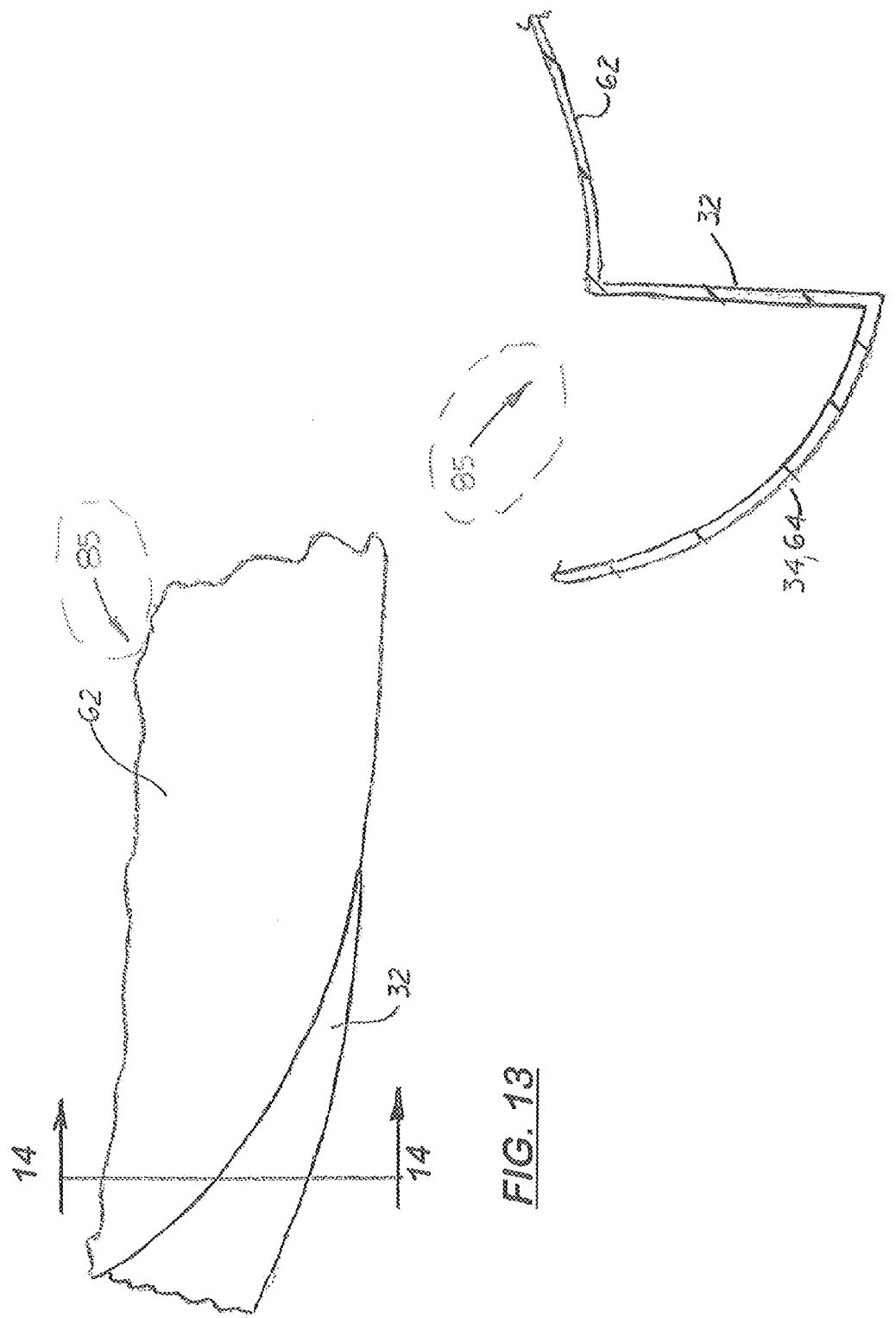

WATERCRAFT WITH ASYMMETRICAL AND SYMMETRICAL BOAT HULL

BACKGROUND OF THE INVENTION

1. Field of the Invention

This invention relates to boat hulls, and more particularly to boat hulls that have both asymmetrical and symmetrical water contact surfaces.

2. Description of the Related Art

There are generally two types of hull designs used with small watercrafts—mono-hulls and multi-hulls. Mono-hulls are usually divided into displacement hulls, planning hulls or semi-displacement hulls. Mono-hulls are typically flat bottom hauls that partially extend and displace more water than multi-hulls. When a mono-hull moves through water, the hull is gradually lifts out of the water and begins to 'plane' when a specific velocity is reached Unfortunately, considerable amount of power is needed to reach and to maintain a 'planning' speed.

Two important benefits of mono-hulls are that they provide a smooth ride at lower speeds normally desired by recreational boaters, and have good turning characteristics.

Multi-hulls typically have two or more parallel hull sections or two outer pontoons separated by an air space, called a tunnel, that extends longitudinally under the hull. Because the two hull sections or pontoons are the only structures in contact with the water and because a cushion of air is produced inside the tunnel to lift and keep the rear portion of the hull out of the water, multi-hulls 'plane' at lower speeds and therefore, require less power to reach and maintain a plane. Because they typically displace less water than mono-hulls, they are especially useful in shadow water environments and in situations where the watercraft must land upright on a beach.

Two disadvantages of multi-hulls is that they are more reactive to waves at low speeds and have poor turning characteristics (i.e. undergo more sideway sliding in turns).

What is needed is a watercraft that uses a hybrid hull design that takes advantage of the benefits of a mono-hull and the benefits of a multi-hull.

SUMMARY OF THE INVENTION

Describe herein is watercraft that uses a hybrid hull that includes two asymmetrical front hull sections and two symmetrical rear hull sections.

The two asymmetrical front hull sections are downward extending pontoon-like structures formed on the front section of the hull on opposite sides of the hull's center axis. Each front hull section includes a flat, vertically aligned inboard surface that extends rearward and gradually intersects with a conical-shaped span deck. The front edge of the inboard surface extends forward and upward and intersects with the gunwale. Formed between the two front hull sections is a span deck. The outboard surface of each front hull section curves downward and inward from the gunwale and intersects with the lower edge of the inboard surface to form a sharp keel that extends parallel to the hull's longitudinal axis.

Formed on opposite sides of the hull behind the two front hull sections are two v-shaped rear hulls sections separated by a tunnel. The two rear hull sections are longitudinally aligned with the vertical inboard surface of the front hull section located on the same side of the hull. The tunnel formed between the two rear hull sections is a narrow, longitudinally aligned tunnel that gradually widens and forms the span deck.

Formed between the front and rear hull sections on each side of the hull are transition sections where the vertical aligned inboard surface on the front hull section and the semi-curved front area of the rear hull section are joined. The transition sections enable water to flow smoothly from the front hull section over the rear hull section. When the hull is viewed from the side, outboard surfaces on the front hull sections and the rear hull sections one each side form a continuous side wall thereby enabling the hull to appear as a mono-hull.

In one embodiment, a short planning surface, hereinafter known as delta surface, is formed on the bottom surface of each rear hull section. Each delta surface may include a longitudinally aligned skeg.

Formed on the bottom surface of the span deck is an optional, longitudinally aligned, conical-shaped wave guard designed to reduce the energy of waves that may impact the span deck.

In summary, the two asymmetrical front hull sections operate like a multi-hull so that less water is displaced by the front section of the hull. When sitting stationary or trolling, the rear portion of the hull displaces water like a mono-hull. When the hull is under power, the front wide opening created between the two front hull sections captures a relatively large volume of air and forces it into the narrow tunnel formed between the two v-shaped rear hull sections to quickly lift the rear portion of the hull. As a result, the hull reaches a 'planning speed' more quickly and consumes less fuel.

DESCRIPTION OF THE DRAWINGS

FIG. 13 is a partial side elevational view of the transition section located between the front hull section and the rear hull section on one side of the hull.

FIG. 14 is a sectional, front elevation view of the transition section shown in FIG. 13.

DESCRIPTION OF THE PREFERRED EMBODIMENT(S)

Figure 1:
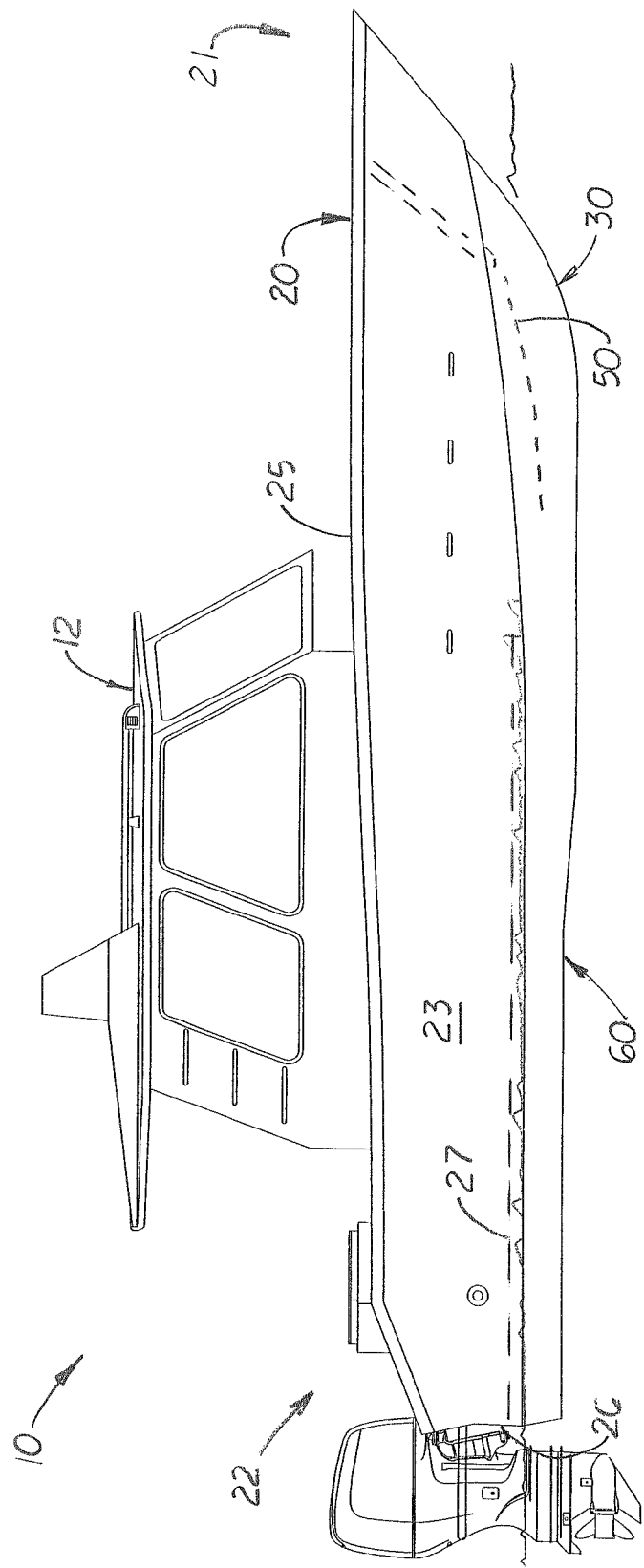
FIG. 1 is a side elevation view of a watercraft that uses an asymmetrical and symmetrical boat hull.

Referring to FIGS. 1-4, there is shown a watercraft 10 that includes a cabin 12 constructed over a hybrid hull 20 that combines the positive performance attributes of a mono-hull and a multi-hull. More particularly, the hull 20 includes two asymmetrical front hull sections, 30, 40, that gradually transition rearward and form two symmetrical rear hull sections 60, 70 separated by a tunnel 80.

The hull 20 includes a bow 21, a stern 22, two side walls 23, 24, a gunwale 25, a transom 26 and a deck 27. The hull 20 also includes two asymmetrical front hull sections 30, 40 that are longitudinally aligned on opposite sides of the hull's center axis 15. In the embodiment shown, the tips 31, 41 of the two front hull sections 30, 40 extend forward and form a pickle front fork 28. It should be understood, however, that the pickle front fork 28 may be desirable on some hulls, it is not a mandatory structure of the invention.

Figure 2:
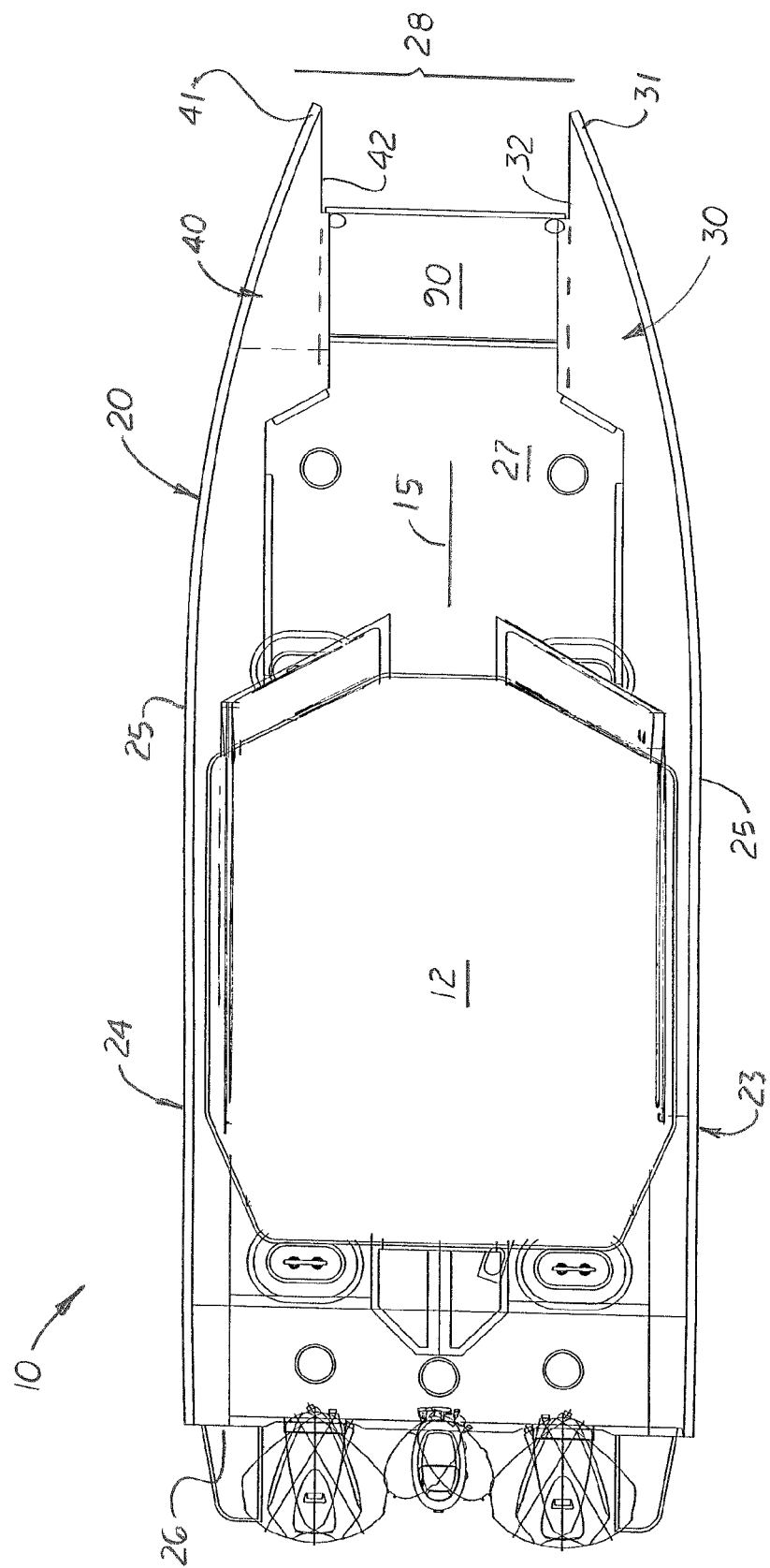
FIG. 2 is a top plan view of the watercraft shown in FIG. 1.
Figure 3:
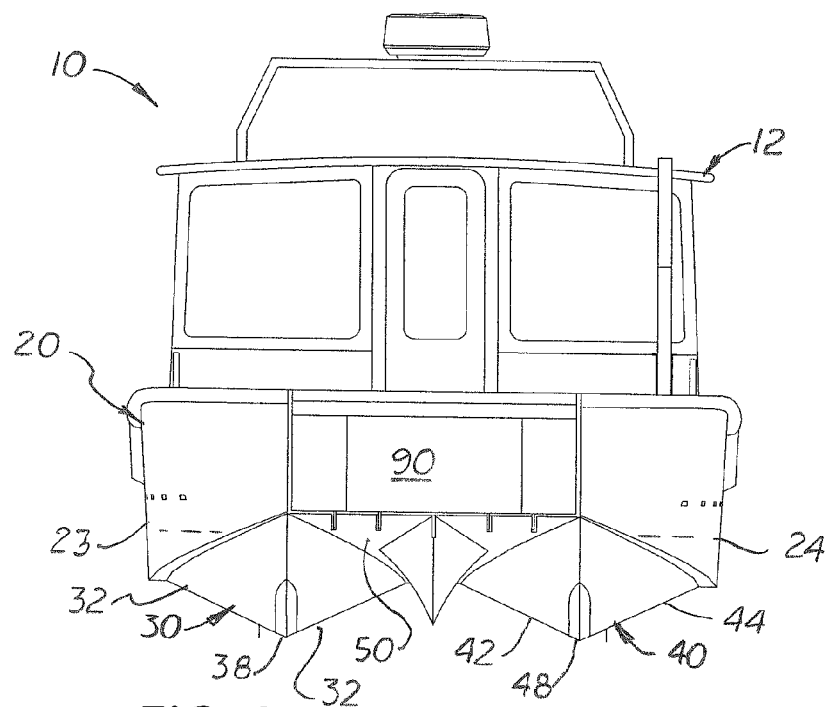
FIG. 3 is a front elevational view of the watercraft shown in FIG. 1.

As shown more clearly, in FIGS. 5, 6, 8, 10, 13 and 14, each asymmetrical front hull section 30, 40 includes a flat, vertically aligned inboard surface 32, 42, respectively, that extends rearward and gradually intersects with a conical shaped span deck 50. The span deck 50 extends along the bottom of the hull 20 between the two asymmetrical front sections 30, 40 and terminates at a transversely aligned, optional front landing door 90 as shown in FIGS. 2 and 3. The span deck 50 may terminate at a front transom or extend upward and meet the gunwale 25 located at the tip of the bow 21. The span deck 50 is transversely aligned and gradually extends upward from the bottom of the hull 20 and forms a wide opening near the bow of the boat that delivers air to the tunnel 80 discussed further below.

Each inboard surface 32, 42 is substantially flat and vertically aligned to extend forward and upward and intersect the gunwale 25 located on the bow 21. The rear edges of the inboard surfaces 32, 44, are located in a transition sections 75, 85 under the hull 20 where the front hull sections 30, 40 intersect with the rear hull sections 60, 70, respectively, also as discussed further below. The lower edges of the inboard surfaces 32, 42, intersect with the lower edges of the outboard surfaces 34, 44, and forms two sharp edges 38, 48 respectively, that during use, operate as two parallel keels.

The outboard surface 34, 44 of each front hull section 30, 40 is diagonally outward and slightly curved and gradually forms the outside surface 64, 74 of the rear hull section 60, 70, respectively. Two full length chimes 28, 29 are formed between the lower edges of the side walls 23, 24 and the outboard sufaces 32, 62 and 34, 64, respectively.

Figure 4:
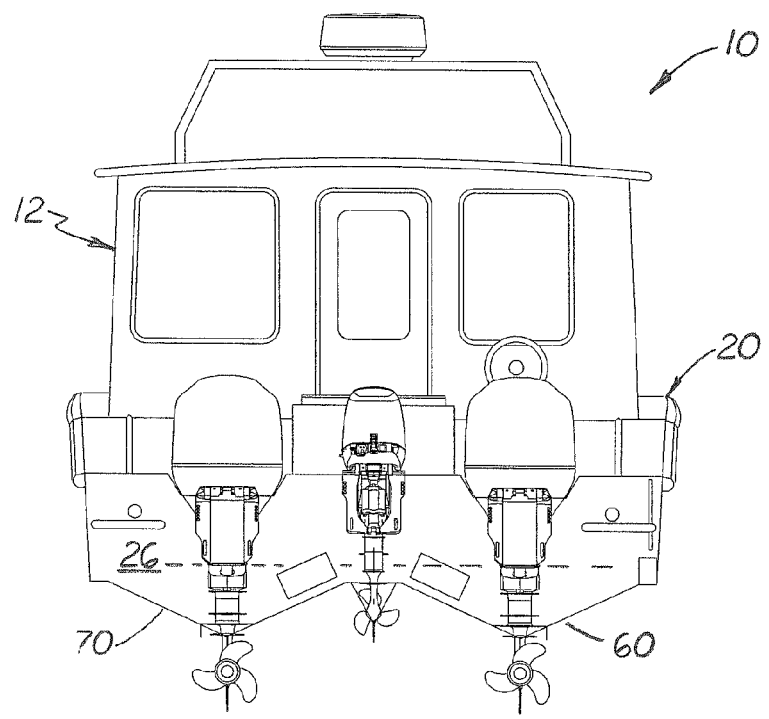
FIG. 4 is a front elevational view of the watercraft shown in FIG. 1
Figure 5:
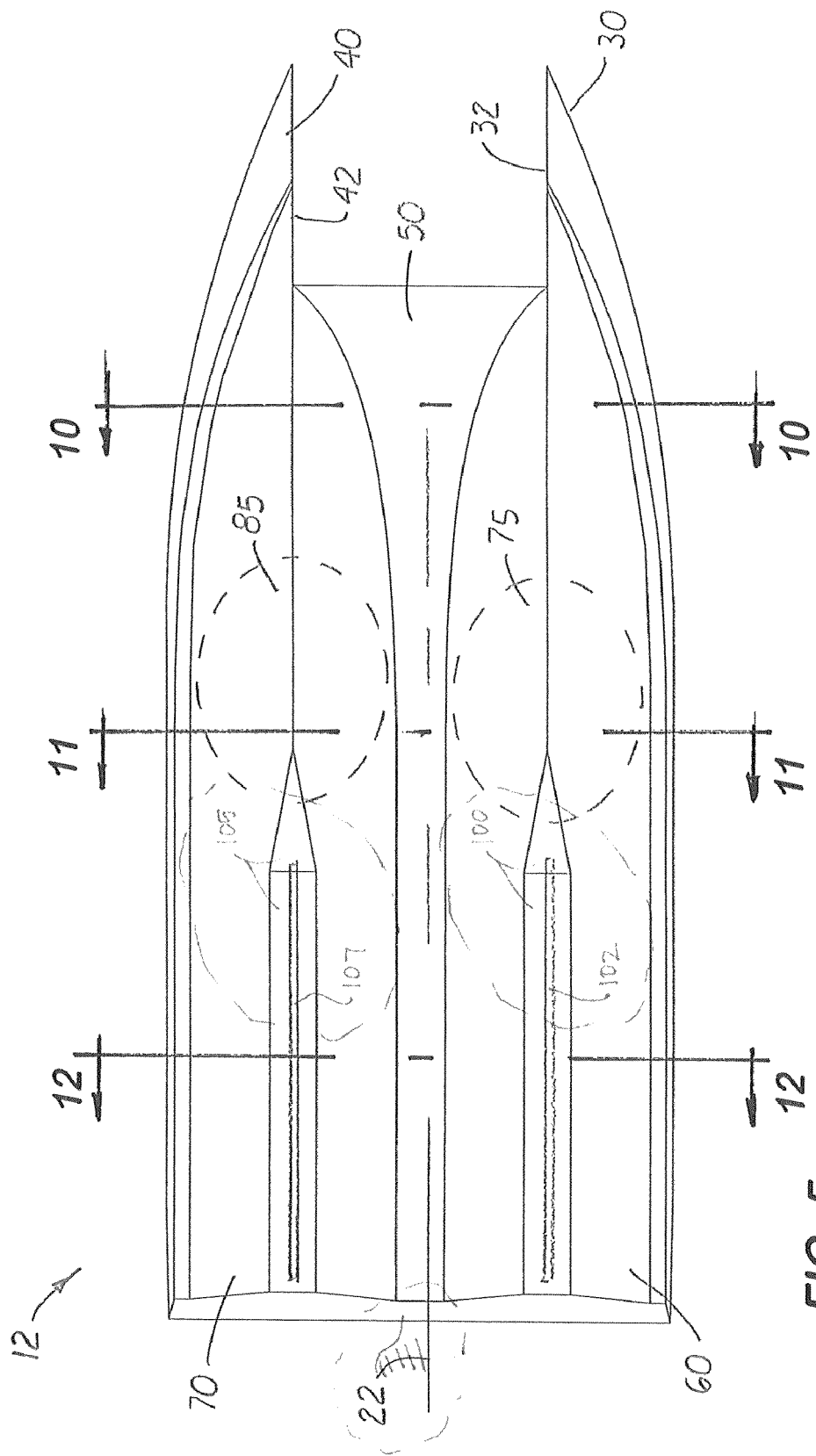
FIG. 5. is a bottom plan view of the hull shown in FIG. 4.
Figure 6:
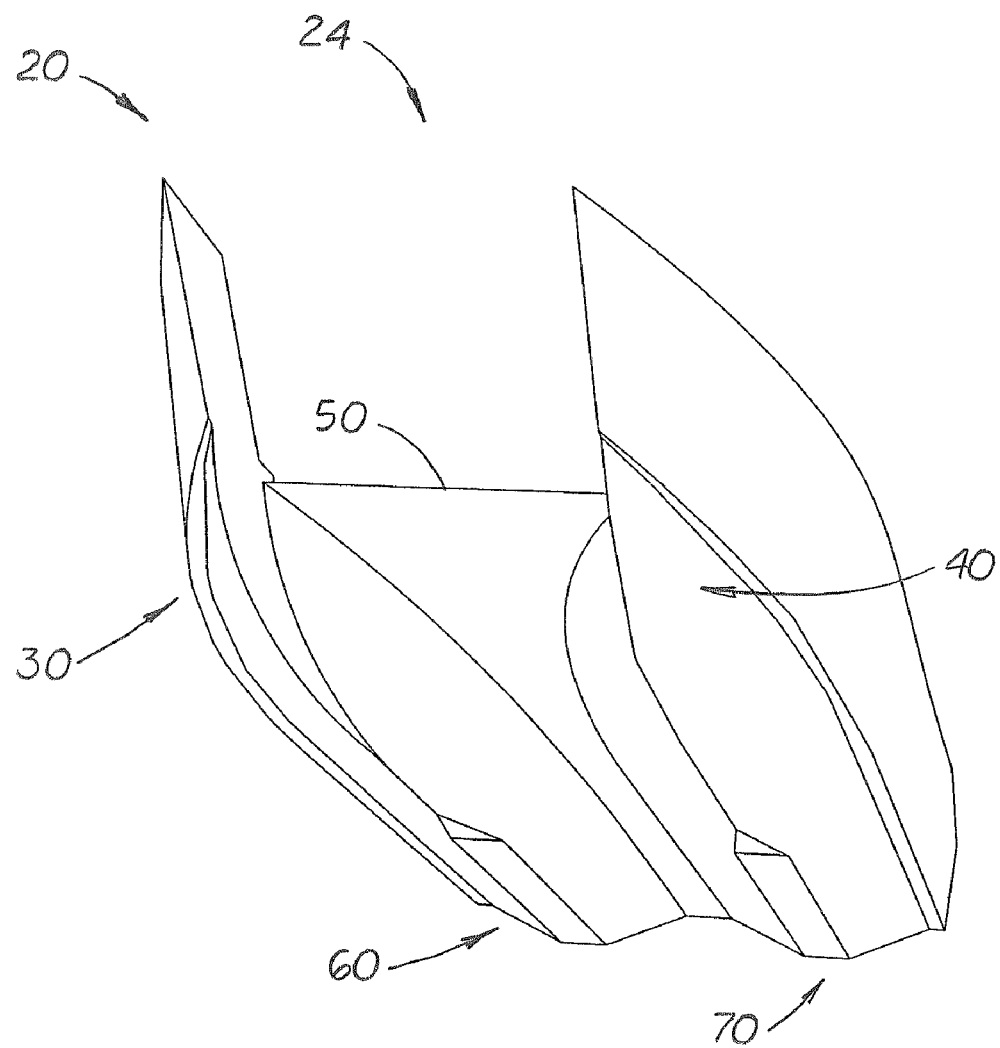
FIG. 6 is a front lower, perspective view of the hull.
Figure 7:
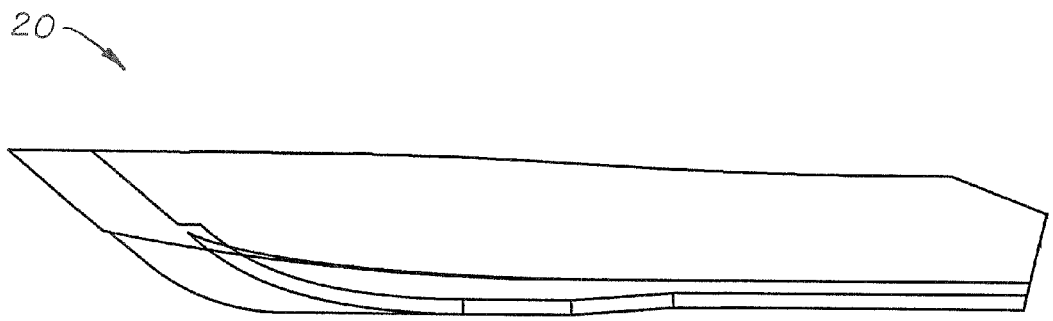
FIG. 7 is a left side elevational view of the hull shown in FIGS. 4 and 5.
Figure 8:
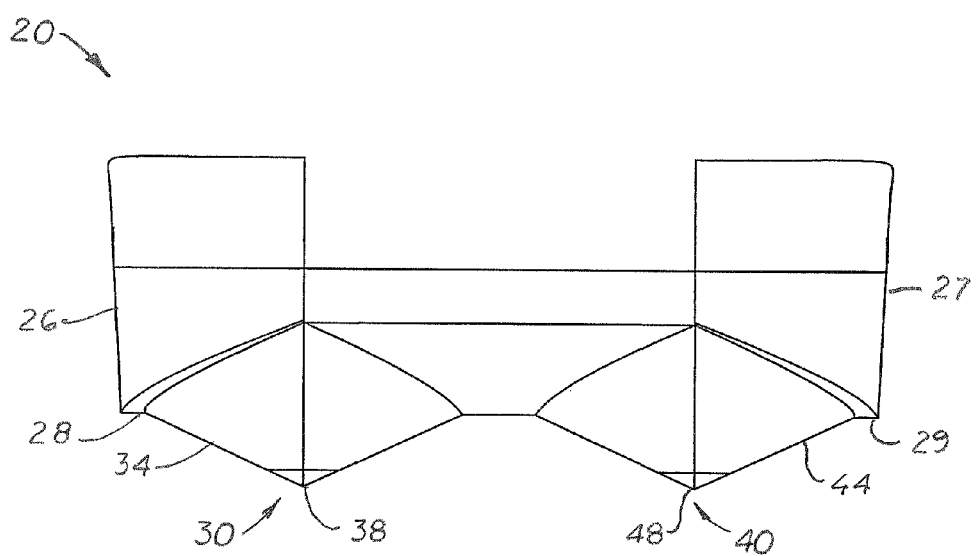
FIG. 8 is a front elevational view of the hull as shown in FIGS. 4-6.
Figure 9:
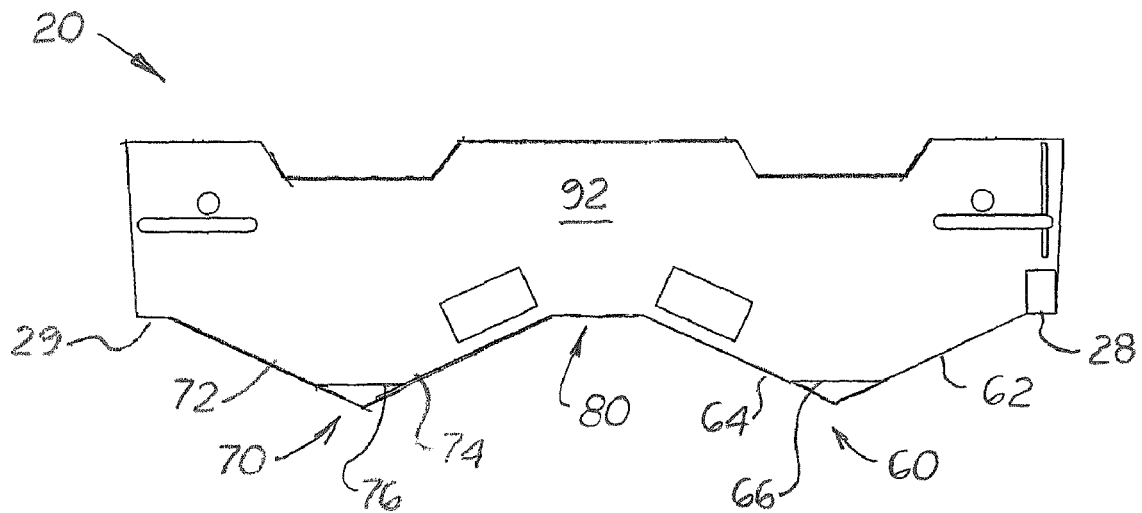
FIG. 9 is a rear elevational view of the hull.
Figure 10:
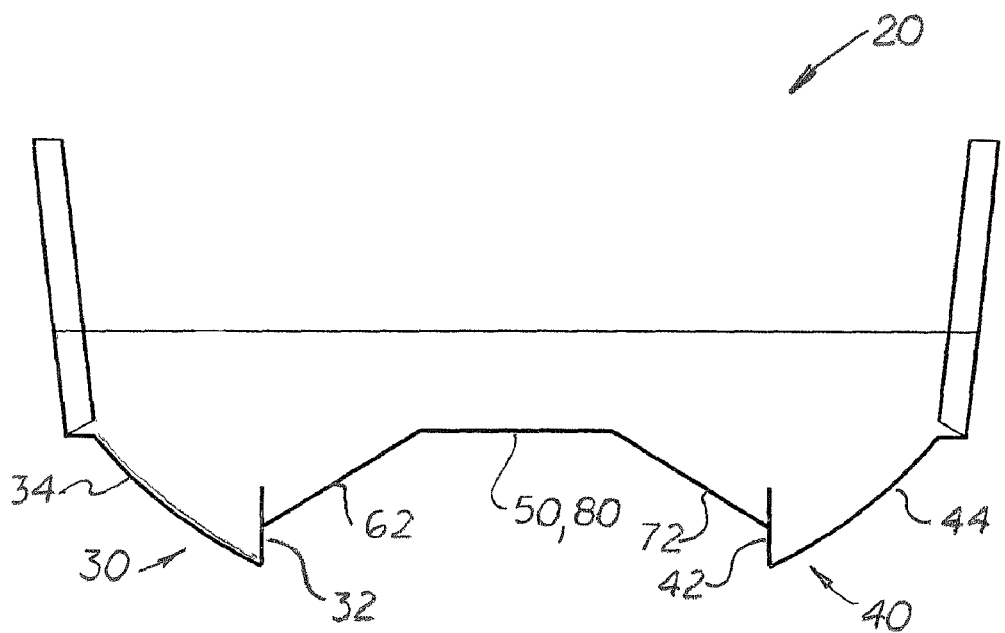
FIG. 10 is a sectional front elevational view taken along line 10-10 in FIG. 5.
Figure 11:
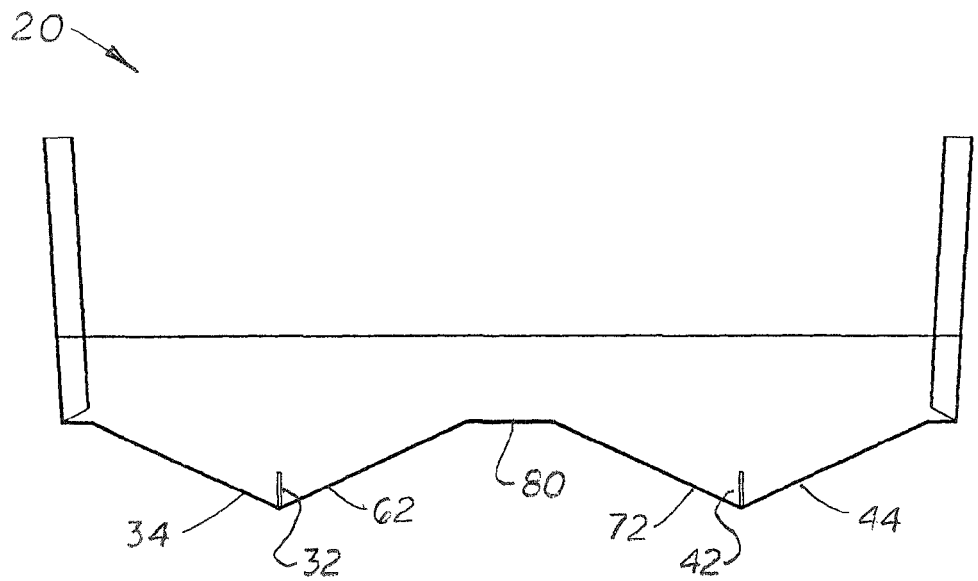
FIG. 11 is a sectional front elevational view taken along line 11-11 in FIG. 5.
Figure 12:
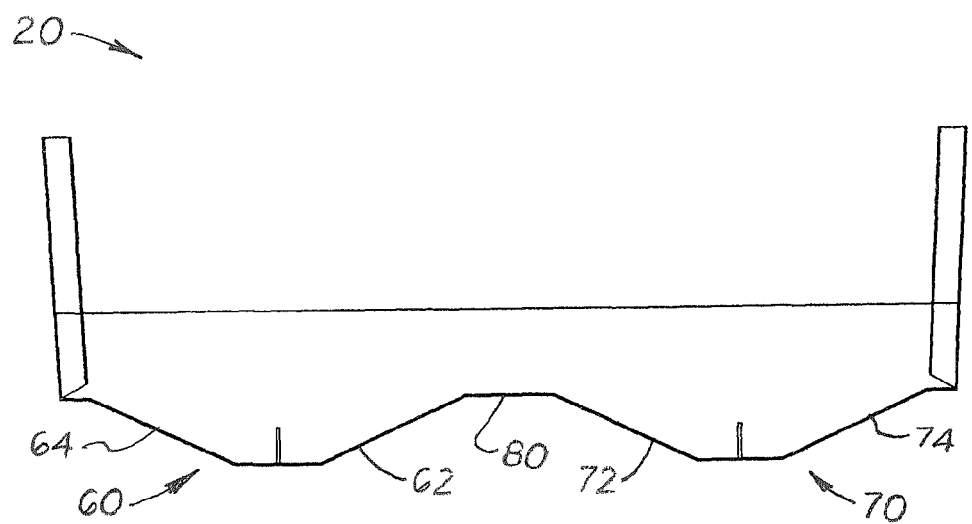
FIG. 12 is a sectional front elevational view taken along line 12-12 in FIG. 5.

As the front hull sections 30, 40 extend rearward, their inboard and outboard surfaces 32, 34 and 42, 44, respectively, gradually blend into the two symmetrical rear hull sections 60, 70, respectively. As shown in FIGS. 4 and 12, the two rear hull sections 60, 70 are v-shaped with diverging, diagonally aligned inboard surfaces 62, 72, and outboard surfaces 64, 74, respectively. The two rear hull sections 60, 70 are longitudinally aligned with the two inboard surfaces 32, 44 located on the two front hull sections 30, 40, respectively.

Formed between the two rear hull sections 60, 70 is a narrow tunnel 80 that extends longitudinally under the hull from the transom 92 to the rear area of the scan deck 50. In the embodiment shown, a single conical shaped plate extends from the transom 92 to the bow and which forms both the tunnel 80 and the scan deck 80 Formed between the front and rear hull sections 30, 60 and 40, 70 on each side of the hull 20 are two transition sections 75 and 85 where the vertical inboard surfaces 32, 42 on the front hull sections 30, 40 interface with the diagonally aligned surfaces 62, 72 on the rear hull sections 60, 70, respectively. As shown in FIGS. 13 and 14, the transition sections (transition section 85 shown) is designed to minimize the amount of turbulence that may be created between hull sections.

In one embodiment, a short delta surface 100, 105 is formed on the bottom surface of each rear hull section, 60, 70, respectively. Each delta surface 100, 105 is centrally aligned over the rear hull section 60, 70 and therefore also longitudinally aligned with the inboard surfaces 32, 42, on the front hull sections 30, 40, respectively. Each delta surface 100, 105 may include a longitudinally aligned skeg 102, 107, respectively.

Formed on the bottom surface of the scan deck 50 between the two front hull sections 30, 40 is an optional, longitudinally aligned, conical-shaped wave guard 120 designed to reduce the energy of waves that may impact the scan deck 50.

As stated above, the inboard vertical surfaces 32, 42, on the two front hull sections 30, 40 are longitudinally aligned with the center longitudinal axis of the rear hull section 60, 70 and the delta surfaces 100, 105. The length the front hull sections 30, 40 may be varied with different hull designs. In most hulls 20, the two rear hull sections 60, 70 are substantially equal extend approximately ⅔ the length of the hull 20. The two delta surfaces 100, 105 are typically located over the back ⅓ length of the hull 20 and forward of the hull's piercing bow points.

As stated above, the two asymmetrical front hull sections 30, 40 operate like a multi-hull so that less water is displaced by the front section of the hull 20. When sitting stationary or trolling, the two rear hull portions 60, 70 displace water like a mono-hull. When the hull 20 is under power, the front wide opening created between the two front hull sections 30, 40 captures a relatively large volume of air and forces it into the narrow tunnel 80 formed between the two rear hull sections 60, 70 to quickly lift the rear portion of the hull 20 out of the water. As a result, the hull 20 reaches a 'planning speed' more quickly and consumes less fuel.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A watercraft hull, comprising:
   a. two asymmetrical front hull sections that form a pickle front fork, each said front hull section includes a substantially straight, vertically aligned inboard surface and a curved outboard surface, said inboard surface and said outboard surface extend rearward are joined together form a sharp edge that acts as a lower keel, said inboard surfaces on said front hull sections being parallel and longitudinally aligned;
   b. a conical shaped, span deck transversely aligned and disposed between said front hull sections;
   c. two symmetrical rear hull sections located behind and longitudinally aligned with said front hull sections and separated by a longitudinally aligned tunnel that extends forward and communicates with said span deck to form a continuous wind passageway under said hull when said hull is operated at a sufficient speed for planning, each said rear hull section is v-shaped in cross-section with a diverting, diagonally aligned inbound surface, each said rear hull section being centrally and longitudinally aligned with said inboard surface of said front hull section longitudinally aligned therewith;
   d. a hull transition section located between said vertically aligned inboard surface on said front hull section and said diagonally aligned inbound surface on said rear hull section longitudinally aligned therewith; and
   e. a delta surface formed on each said rear hull sections.

2. The watercraft hull, as recited in claim 1, further including a skeg attached to each said delta surface.

3. The watercraft hull, as recited in claim 2, wherein said skeg is longitudinally aligned with said keel on said front hull section.

4. The watercraft hull, as recited in claim 1, further including a loading door mounted between said front hull sections.

* * * * *